Nov. 19, 1968   D. MARINOZZI, JR   3,411,852
OPTICAL MONITORING APPARATUS WHICH INCLUDES A REFLECTOR SYSTEM
FOR FOCUSING LIGHT ON A SAMPLE AND FOR RECEIVING
LIGHT REFLECTED FROM THE SAMPLE
Filed Nov. 6, 1963
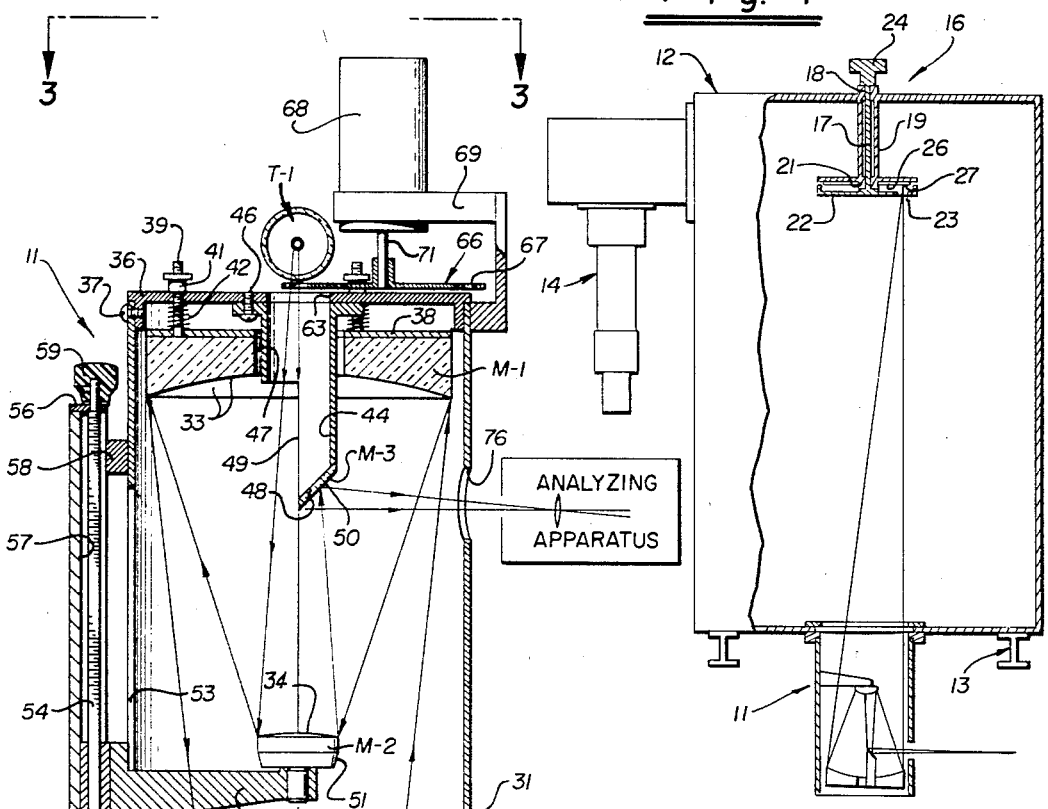
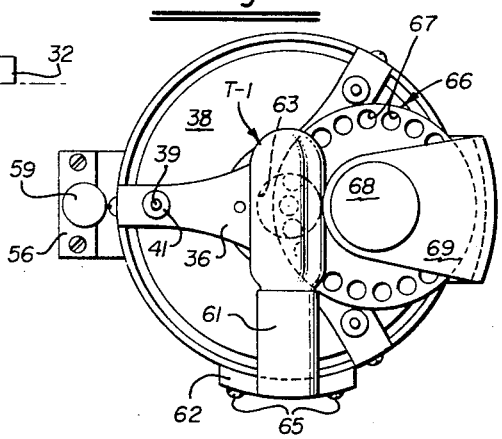
INVENTOR.
*Domenick Marinozzi, Jr.,*
*NMI*
BY
Attorneys

United States Patent Office 3,411,852
Patented Nov. 19, 1968

3,411,852
OPTICAL MONITORING APPARATUS WHICH INCLUDES A REFLECTOR SYSTEM FOR FOCUSING LIGHT ON A SAMPLE AND FOR RECEIVING LIGHT REFLECTED FROM THE SAMPLE
Domenick Marinozzi, Jr., Westtown, Pa., assignor to Optical Coating Laboratory, Inc., Santa Rosa, Calif., a corporation of California
Filed Nov. 6, 1963, Ser. No. 321,888
5 Claims. (Cl. 356—24)

ABSTRACT OF THE DISCLOSURE

Optical monitoring apparatus for monitoring the reflectivity of an element and having first and second reflecting mirrors and means for supplying energy to the second mirror, the first and second mirrors being arranged so that the second mirror reflects a portion of the energy to the first mirror and in which the first mirror reflects a portion of said energy to the element, said element being adapted to reflect a portion of the energy reflected thereon to the first mirror and the first mirror reflecting a portion of the energy to the second mirror, means for receiving energy and a third mirror receiving energy from the second mirror and reflecting it to the means for receiving energy.

---

This invention relates to an optical monitoring apparatus and method and more particularly to an on-axis optical monitoring apparatus and method particularly adapted for use in the manufacture of articles utilizing vacuum deposition.

As is well known to those skilled in the art, the manufacture of interference filters required the vacuum deposition of closely controlled thicknesses of materials onto a substrate surface. As is also well known to those skilled in the art, there are many interdependent variables associated with the production of excellent quality interference filters. One very important control aspect is the continuous monitoring of evaporated material accumulation upon the substrate surface. By alternately changing the material and thickness in successive layers, a large variety of interference filters can be produced. Conversely, the consistency of the product from the standpoint of time is, therefore, strongly influenced by the precise control of successive layers. Many types of monitoring systems have heretofore been utilized. One typical type of monitoring system employs refracting elements. Because of the use of such refracting elements, each wave length of light focuses at slightly different position physically. This introduces a problem in a monitoring system in that every time a wave length position is changed, the system must be refocused in order to accept the full cone of illumination. In addition, there is a problem when utilizing refracting elements that there are selective absorption bands at various wave lengths which are determined by the material being utilized. Amplification has been utilized to attempt to overcome this problem but this amplification also amplifies the noise so that often an unsatisfactory noise to signal ratio may prevail. In view of the foregoing difficulties, there is a need for a new and improved optical monitoring apparatus and method.

In general, it is an object of the present invention to provide an optical monitoring apparatus and method which overcomes the above named disadvantages.

Another object of the invention is to provide an optical monitoring apparatus and method of the above character which utilizes reflecting surfaces only.

Another object of the invention is to provide an optical monitoring apparatus and method of the above character which can be used over relatively great wave length ranges.

Another object of the invention is to provide an optical monitoring apparatus and method of the above character which is achromatic so that all energy from the source focuses at precisely the same point thereby eliminating the necessity for refocusing with each wave length change.

Another object of the invention is to provide an optical monitoring apparatus and method of the above character which has relatively high signal level throughout the wave length regions being monitored.

Another object of the invention is to provide an optical monitoring apparatus and method of the above character in which the image focal point can be simply adjusted from zero to infinity distance.

Another object of the invention is to provide an optical monitoring apparatus and method in which an on-axis arrangement is utilized to preclude the possibility of spurious energy entering the apparatus.

Another object of the invention is to provide an optical monitoring apparatus of the above character in which reflecting mirrors are utilized.

Another object of the invention is to provide an optical monitoring apparatus of the above character which can be initially adjusted before installation on a machine and then installed on the machine.

Another object of the invention is to provide an optical monitoring apparatus of the above character which can be readily mounted upon the machine on which the monitoring is to take place.

Another object of the invention is to provide an optical monitoring apparatus which is relatively simple and inexpensive to build, easy to operate and which particularly lends itself to the refinement of wave length and thickness control in the vacuum deposition of materials for the manufacture of interference filters.

Additional objects and features of the invention will appear from the following description in which the preferred embodiment is set forth in detail in conjunction with the accompanying drawings.

Referring to the drawings:

FIGURE 1 is a plan elevational view in cross-section of a vacuum deposition chamber in which optical monitoring apparatus incorporating my invention is mounted.

FIGURE 2 is a side elevational view in cross-section of the optical monitoring apparatus shown in FIGURE 1.

FIGURE 3 is a plan view looking along the line 3—3 of FIGURE 2.

In general, my optical monitoring apparatus consists of a housing with a first reflecting mirror disposed in the housing and having a first reflecting concave surface. A second reflecting mirror of a size smaller than the first mirror and axially aligned with the first mirror is also disposed in the housing and has a first reflecting convex surface. Means is mounted on the housing for supplying energy to the second mirror so that energy is reflected from the second mirror to the first mirror and from the first mirror to the monitor disk or chip. A third mirror having a first reflecting surface is mounted in the housing for receiving energy reflected from the chip to the first mirror then to the second mirror and then to the third mirror. The energy reflected by the third mirror is analyzed to determine the characteristics of the coating being monitored.

As shown in FIGURE 1 of the drawings, my optical monitoring apparatus 11 is secured to the bottom of a vacuum chamber 12 mounted upon a framework 13. The vacuum chamber is adapted to be evacuated by suitable means such as a vacuum pump 14 connected to the chamber 12.

Means can be provided (not shown) for carrying the articles which are to be coated and means (not shown) can also be provided for evaporating the materials which are to be utilized for the coatings. For example, means of the type disclosed in copending application Ser. No. 137,168, filed Sept. 11, 1961, can be utilized.

Means is also provided for placing a plurality of monitoring chips sequentially in a position so that they can be monitored by the optical monitoring apparatus. As shown, such chip positioning means can take the form of a manually operable device consisting of a shaft 17 rotatably mounted in a bearing 18 and extending through a tubular member 19 fixed to the chamber 12. The shaft 17 is also rotatably mounted in a bearing 21 fixed to the end of the tubular member 19. A disc 22 is affixed to the shaft 17 and is rotatable therewith. The disc 22 is provided with an aperture 23. The shaft 17 can be rotated with suitable means such as a knob 24. A stationary disc 26 is affixed to the stationary tubular member 19 and carries the chips 27 which are used for monitoring. The chips can be exposed one by one by shifting the aperture 23 in the disc 22 by operation of the knob 24.

The optical monitoring system 11 itself consists of an open-ended cylindrical housing or tube 31 which is provided with a flange 32 on one end which is used for securing the cylindrical housing to the vacuum chamber 12. A primary mirror M1 is disposed in the other end of the cylindrical housing 31. A secondary mirror M2 and in intercept or third mirror M3 are also disposed within the cylindrical housing or tube 31. The primary mirror M1 has a first reflecting surface 33 which is concave, whereas the mirror M2 has a first reflecting surface 34 which is convex. The surfaces 33 and 34 are spherical and are approximately concentric. However, it should be pointed out that image quality is not of prime importance in this optical monitoring apparatus and, therefore, strict adherence to concentricity is unnecessary.

Means is provided for mounting the primary mirror M1 and the intercept mirror M3 and consists of a three-legged spider or support plate 36 which is secured to the housing by suitable means such as screws 37. A backing plate 38 is mounted on the primary mirror M1 by suitable means such as a room temperature vulcanized adhesive to minimize stresses on the mirror. Threaded studs 39 are mounted on the backing plate 38 and extend outwardly therefrom. The studs 39 extend through the support plate 26 and are secured thereto by knurled nuts 41. Springs 42 are mounted on the studs between the backing plate 38 and the support plate 36 and serve to spring load the mirror so that it is always positively urged away from the plate 36 and places the studs 39 under tension to thereby provide a three point mounting system for the primary mirror M1.

A cylindrical intercept mirror mount 44 is secured to the support plate 36 by suitable means such as screws 46. The cylindrical mirror mount 44 extends through an opening 47 provided in the primary mirror M1 and its backing plate 38. The mirror mount 44 is provided with an inclined surface 48 which inclines at a suitable angle as, for example, an angle of 45°. The mirror mount 44 is also provided with a cut-out 49 at its inner end which is semi-cylindrical.

It can be seen that the mounting for the mirror M1 provides means whereby the primary mirror M1 can be tipped through 360° by merely adjusting the three knurled nuts 41. The springs 42 help to keep the primary mirror M1 in alignment with the secondary mirror M2.

Means is provided for mounting the secondary mirror M2 in the housing 31 and consists of a button or holder 51 which is T shaped in cross section and which is mounted upon an arm 52. The arm 52 is disposed in an elongate slot 53 provided in the side wall of the housing 31 and extending longitudinally of the housing. Means is provided for adjusting the arm 52 longitudinally of the housing in the slot 53 and consists of a micrometer screw 54 which is threaded into the arm and which is rotatably mounted in end plates 56 mounted upon a guide member 57. The guide member 57 is spaced from the housing and is secured to the housing by blocks 58. A knob 59 is provided for operating the screw 54. It can be seen that by operation of the knob 59 that the secondary mirror M2 can be adjusted longitudinally of the housing 31.

The mirror M3 is mounted upon the mount 44 by suitable means such as cement. The mirror M3 is provided with a first reflecting surface 50 which is provided with a reflecting coating. Thus, it can be seen that all the mirrors M1, M2 and M3 are first surface reflectors.

Energy for the apparatus is supplied from a suitable source as, for example, a tungsten lamp T1 mounted in a holder 61 secured to a bracket 62 mounted on the side wall of the cylindrical housing 31 by suitable means such as screws 65. Means is provided in the form of slots (not shown) through which the screws 65 extend for adjusting the bracket 62 on the housing 31 so that the lamp T1 can be adjusted relative to the secondary mirror M2. Thus, it is possible to adjust the lamp T1 axially of the cylindrical housing 31 and with reference to the secondary mirror M2. The light from the lamp T1 passes through a hole 63 provided in the support plate 36 and through the cylindrical mount 44 as shown by the arrows in FIGURE 2.

Means is provided for periodically interrupting or stopping the travel of energy from the source T1 to the second mirror M1 and consist of a chopper disc 66 which is provided with a plurality of equally spaced circumferentially positioned apertures or holes 67 near the outer margin of the disc 66. Means is provided for rotating the chopper disc 66 and consists of a motor 68 of a suitable type such as an 1800 r.p.m. synchronous motor which is carried by a bracket 69 affixed to the side wall of the cylindrical housing 31. The output shaft 71 of the motor 68 is secured to the chopper disc 66 and serves to drive the chopper disc so that the chopper disc periodically intercepts the light from the energy source T1. The chopping rate can be any desired rate as, for example, 510 cycles per second which corresponds to the chopping rate of a Hewlett-Packard standing wave indicator amplifier. As is well known to those skilled in the art, such an amplifier will only amplify and see that energy which is received at the 510 cycle per second rate. Thus, it discriminates and will not amplify anything else.

The housing 31 is provided with a port 76 which is in alignment with the intercept mirror M3 through which light reflected from the mirror M3 passes. Means not shown including the standard wave indicator amplifier identified above and monochrometer can be used evaluating the energy reflected by the intercept mirror M3.

Operation of my optical monitoring apparatus in performing my method may now be briefly described as follows. Let it be assumed that it is desired to monitor the coating placed on a monitoring chip 27 carried by the disc 26 in the coating apparatus. Energy from the tungsten lamp T1 which is operated at a constant voltage is chopped by the chopping disc 66 and enters the optical monitoring apparatus through the hole 63 provided in the plate 36 and through the hole 47 provided in the primary mirror M1. This cone of energy which passes from the tungsten lamp T1 through the mount 44 is interrupted by the small intercept mirror M3 so that only half of the cone of energy falls on the secondary mirror M2. From this convex surface 34 of the mirror M2, the half cone of energy is reflected back onto the primary mirror M1 as a diverging half cone. The primary mirror then focuses this energy through the open end of the cylinder 31 onto tht monitor chip 27 in a converging half cone, the focal length of which is dependent upon the relative position of the secondary mirror M2 to the primary mirror M1.

The monitor chip 27 which is situated inside the vacuum chamber and which received the evaporated material reflects energy back toward the primary mirror M1 which collects it and reflects it toward the secondary mirror M2 which serves to converge the energy back towards the source T1. However, the intercept mirror M3 reflects this energy at a 90° angle out of the side port 76 where it can be utilized in a number of ways to determine the optical and geometric thickness of the successive layers being deposited upon the monitor chip 27.

As is well known to those skilled in the art, as coating material is deposited on the monitor chip 27, the reflectivity properties of the monitor chip change so that the energy levels reflected will also change. The energy reflected through the port 76 can, for example, be utilized in a monochrometer and evaluated for wave length and energy level, or it can be utilized with interference filters, absorption filters or any number of other ways to evaluate the signal strength and wave length. The primary purpose of the apparatus is to distinguish primary precise wave length positions and to thereby deposit very closely controlled thicknesses on the chip 27 so that it is possible to make a multitude of different multilayer interference filters.

The optical arrangement utilized provided a simple means of adjustment and for varying the image focal point from essentially zero to infinity distance in front of the support tube or housing. As hereinbefore explained, this adjustment is accomplished by displacing the secondary mirror axially relative to the primary mirror by turning a micrometer screw mounted on the outside surface of the housing. This simple adjustment permits the monitoring apparatus to be utilized with various sizes of coating machines with a minimum of difficulty.

My optical monitoring apparatus and method has many distinct advantages. For example, it is fully achromatic. Reflecting surfaces only are utilized which permits the monitoring system to be utilized over greater wave length ranges. Since it is achromatic, all energy from the source focuses at precisely the same point to thereby eliminate the necessity for refocusing with each wave length change. Higher signal levels are achieved in those wave length regions which normally would be attenuated by absorption in a refracting system.

My optical monitoring apparatus and method has additional advantages in that magnification in this folded system provides almost 1:1 object to image size under normal conditions (e.g. within distances of 10 inches to 30 inches from the primary mirror M1) enabling it to be used without serious increase in image size at the monitor chip.

As can be seen from the drawings, an on-axis arrangement is utilized for the optical system which precludes the possibility of spurious energy entering the system from unwanted sources such as incandescent heaters, etc. which could produce a false signal. In addition, the on-axis spherical reflectors M1 and M2 exhibit relative immunity to axial vibration. Also because of the compactness of design, displacement of the optical elements is minimized.

It can be seen from the foregoing that I have provided a new and improved monitoring apparatus and method which is relatively compact and which is relatively inexpensive to build, easy to operate and which can be readily installed on coating apparatus.

What is claimed is:

1. In an optical monitoring apparatus for monitoring an element, a first reflecting mirror, said first reflecting mirror having a centrally disposed opening therein, means for mounting said first refllecting mirror in said housing to permit angular adjustment of said first reflecting mirror relative to said housing, a second reflecting mirror, means for mounting said second reflecting mirror in said housing so that it is spaced from said first reflecting mirror and so that the optical axis of said second reflecting mirror is in axial alignment with the optical axis of the first reflecting mirror, said means for mounting said second reflecting mirror permitting adjustment of said reflecting mirror longitudinally of the housing to vary the spacing between the first and second reflecting mirrors, a source of energy disposed adjacent said opening in said first reflecting mirror so that the energy from the source passes through the opening and strikes said second reflecting mirror in said housing, said first and second reflecting mirrors having curvatures and being spaced so that energy from the source reflected by the second reflecting mirror is focussed onto the element, said element serving to reflect a portion of the energy focussed thereon to return energy to the first reflecting mirror and thence to the second reflecting mirror, a third reflecting mirror, means for receiving energy and means mounting said third reflecting mirror in said housing at an angle with respect to the optical axes of said first and second reflecting mirrors and so that the third reflecting mirror reflects energy returning from the element onto the means for receiving energy.

2. Optical monitoring apparatus as in claim 1 wherein said first, second and third reflecting mirrors have first reflecting surfaces, wherein said first mirror has a concave reflecting surface and said second reflecting mirror has a convex reflecting surface, and wherein said first reflecting mirror has a size which is substantially greater than the second reflecting mirror.

3. Optical monitoring apparatus as in claim 1 together with means for chopping the energy from said source at a predetermined rate at a point before the energy passes through the opening in said first reflecting mirror, said means for chopping the energy including a disc having a plurality of holes therein and means for rotating the disc.

4. Optical monitoring apparatus as in claim 1 wherein said means for mounting said first reflecting mirror comprises a backing plate secured to said first reflecting mirror, a mounting plate secured to said housing, threaded studs mounted on the backing plate on said first reflecting mirror and extending through said mounting plate, springs disposed on said studs between said mounting plate and said backing plate and nuts threaded on said studs, and wherein said means for mounting said third reflecting mirror comprises a mounting member secured to said mounting plate and extending through said opening is said first mirror, means for securing said third reflecting mirror to said mounting member, said mounting member being substantially cylindrical with a substantially semi-cylindrical cutout at its innermost end, said third reflecting mirror being mounted on said mounting member at an angle with respect to the longitudinal axis of said mounting member.

5. Optical monitoring apparatus as in claim 1 wherein said means for mounting said second reflecting mirror consists of a relatively narrow arm extending into said housing, means for mounting said second reflecting mirror on said arm, a micrometer screw rotatably mounted on said housing externally of the housing and extending through said arm for adjusting said arm longitudinally of said housing.

References Cited

UNITED STATES PATENTS

| 2,437,608 | 3/1948 | Long et al. | 88—14 |
| 2,884,830 | 5/1959 | Hildebrand | 88—14 |
| 3,012,473 | 12/1961 | Astheimer et al. | 88—14 |
| 3,034,396 | 5/1962 | Wilcox | 88—14 |
| 3,049,054 | 8/1962 | Waland | 350—199 |

FOREIGN PATENTS

| 359,783 | 3/1962 | Switzerland. |
| 715,444 | 9/1954 | Great Britain. |

JEWELL H. PEDERSEN, *Primary Examiner.*

O. B. CHEW, *Assistant Examiner.*